(12) United States Patent
Gausmann et al.

(10) Patent No.: US 8,137,081 B2
(45) Date of Patent: Mar. 20, 2012

(54) COMPRESSOR UNIT

(75) Inventors: Rainer Gausmann, Duisburg (DE);
Gaston Mathijssen, Borne (NL)

(73) Assignee: Siemens Aktiengesellschaft, Munich (DE)

( * ) Notice: Subject to any disclaimer, the term of this patent is extended or adjusted under 35 U.S.C. 154(b) by 687 days.

(21) Appl. No.: 12/223,488

(22) PCT Filed: Jan. 31, 2007

(86) PCT No.: PCT/EP2007/050938
§ 371 (c)(1),
(2), (4) Date: Mar. 3, 2009

(87) PCT Pub. No.: WO2007/090775
PCT Pub. Date: Aug. 16, 2007

(65) Prior Publication Data
US 2009/0220362 A1   Sep. 3, 2009

(30) Foreign Application Priority Data

Feb. 3, 2006  (EP) ..................................... 06002310

(51) Int. Cl.
*F04B 25/00* (2006.01)
(52) U.S. Cl. ..................... 417/423.12; 417/365; 417/244
(58) Field of Classification Search .................. 417/244, 417/247, 365, 423.12
See application file for complete search history.

(56) References Cited

U.S. PATENT DOCUMENTS

| 3,606,594 A * | 9/1971 | Smith et al. ..................... 417/415 |
| 4,834,624 A * | 5/1989 | Jensen et al. ................... 417/370 |
| 4,867,652 A * | 9/1989 | Gormley ....................... 417/353 |
| 4,969,803 A | 11/1990 | Turanskyj |
| 5,358,378 A * | 10/1994 | Holscher ..................... 415/170.1 |
| 5,514,924 A * | 5/1996 | McMullen et al. ........... 310/90.5 |
| 7,144,226 B2 * | 12/2006 | Pugnet et al. ................. 417/244 |
| 7,240,515 B2 * | 7/2007 | Conry ............................. 62/510 |
| 8,061,970 B2 * | 11/2011 | Maier et al. ..................... 415/104 |
| 2002/0037772 A1 | 3/2002 | Fisch |
| 2004/0179961 A1 | 9/2004 | Friez |
| 2009/0263265 A1* | 10/2009 | Mathijssen et al. ............. 418/83 |
| 2009/0311108 A1* | 12/2009 | Mathijssen et al. ............. 417/53 |
| 2011/0217197 A1* | 9/2011 | Frazier et al. ..................... 418/1 |

FOREIGN PATENT DOCUMENTS

| DE | 3729486 C1 | 12/1988 |
| DE | 19833033 A1 | 1/1999 |
| WO | WO 02/099286 A1 | 12/2002 |
| WO | WO 2004094833 A1 | 11/2004 |

* cited by examiner

*Primary Examiner* — Peter Macchiarolo

(57) ABSTRACT

A compressor unit for underwater operation is provided. The compressor unit includes a compressor having a compressor rotor and a plurality of compressor stages. The compressor unit also includes an electric motor having a stator, a motor rotor, and a gastight housing which is provided with an inlet and an outlet. The motor rotor has two radial bearings, namely a first radial bearing and a second radial bearing, each arranged at the ends of the motor rotor. The compressor rotor has two radial bearings, namely a third radial bearing and a fourth radial bearing, each arranged at the ends of the compressor rotor. A coupling which transmits torque is arranged between the two rotors. The above arrangement provides a remedy for vibrations for especially large compressor units.

12 Claims, 1 Drawing Sheet

COMPRESSOR UNIT

CROSS REFERENCE TO RELATED APPLICATIONS

This application is the US National Stage of International Application No. PCT/EP2007/050938, filed Jan. 31, 2007 and claims the benefit thereof. The International Application claims the benefits of European application No. 06002310.8 filed Feb. 3, 2006, both of the applications are incorporated by reference herein in their entirety.

FIELD OF INVENTION

The invention relates to a compressor unit, especially for underwater operation, comprising a compressor with a compressor rotor which has one or more compressor stages, furthermore comprising an electric motor with a stator and a motor rotor, and comprising a gastight casing which is provided with an inlet and an outlet, wherein the motor rotor has two radial bearings which are arranged at the ends in each case, these being a first radial bearing and a second radial bearing, wherein the compressor rotor has two radial bearings which are arranged at the ends in each case, these being a third radial bearing and a fourth radial bearing and wherein a coupling, which transmits torque, is arranged between the two rotors.

BACKGROUND OF THE INVENTION

Most recent developments in the field of compressor construction are also focused on the undersea arrangement of large compressors, which are to serve for the delivery of natural gases. The special operating conditions, especially on account of the severely restricted accessibility both for maintenance purposes and by means of supply lines, presents great challenges to experts in this field. Relevant environmental regulations forbid any material exchange between the units which are to be installed and the surrounding seawater. There is also the fact that the seawater is an aggressive medium and extreme pressure and temperature conditions are to be encountered at different depths of the sea. Another requirement lies in the fact that the units are to have an exceptionally long service life and also have to be formed in an almost maintenance-free manner. In addition, a significant contamination of the partially chemically aggressive medium which is to be delivered makes it more difficult.

A compressor unit of the aforementioned type is already known from international patent publication WO 02/099286 A1. This document deals with the object of uncompromising simplification for reducing the maintenance cost, and with simultaneously longer service life. To achieve this object, the document proposes to design the compressor rotor in one piece with the motor rotor and to support the compressor rotor and motor rotor at the ends in each case by means of just two radial bearings. In addition, a separate thrust bearing is provided. However, with increasing overall size, it is shown that the motor rotor, which is dynamically very dominant on account of its own large weight, especially on account of thermal unbalance in the case of different operating temperatures and corresponding speeds, can cause severe vibrations which reduces the service life or unacceptably shortens the maintenance intervals.

In addition, it is known from European patent publication EP 1 074 746 B1 to equip a turbocompressor with three radial bearings, wherein the motor rotor is connected to the compressor rotor by means of a coupling. The motor rotor, which is dynamically very dominant, in this case is supported by means of two of the three radial bearings. The compressor rotor is supported at the end of the resulting common rotor by only one radial bearing. Also in this case, it is shown after a defined order of magnitude that vibrations can become comparatively large.

A compressor with a directly connected electric motor which is enclosed by a common casing are known in each case from US 2002/0037772 A1, DE 37 29 486 C1, US 2004/0179961 A1 and WO 2004/094833 A1. In each of these documents, the rotors of the electric motor and of the compressor are radially and axially supported in a different way. For example, an arrangement with four bearings and a flexible coupling between the compressor shaft and the electric motor shaft is known from these documents.

SUMMARY OF INVENTION

Starting from the problems and disadvantages of the prior art, an object of the invention is to provide an improved compressor unit of the type mentioned in the introduction, which requires low maintenance cost and has a long service life, and is characterized especially by an only low vibration occurrence.

For achieving the object, the invention proposes a compressor unit as claimed in the independent claim. The dependent claims contain in each case advantageous developments of the invention.

The particular advantage of the invention lies in the extremely efficient controlling of the rotor vibrations, especially those which are stimulated by the thermal unbalance. The two-sided bearing of the motor rotor leads to an efficient damping of the motor rotor which is dynamically very dominant on account of its own weight. However, resulting vibrations cannot stimulate the compressor rotor to inacceptable vibrations. This is because the compressor rotor also has a respective two-sided bearing support, which provides an efficient damping at the two bearing points of the compressor rotor. In this way, even a large overall size can be dynamically controlled even at high speeds.

The arrangement of the coupling between the two rotors brings further advantages, which are not only with regard to the installation. In the proposed formation, especially the compressor rotor can be produced in any type of construction. For example, the compressor rotor can be formed from one piece or with stages which are individually mounted upon a shaft. The stages, in turn, can be split in the circumferential direction, or can be in one piece, as necessary. There are no connection problems on account of the separate compressor rotor which is supported at the ends. In particular, the compressor rotor, on being separated from the radial bearings, can also be continuously fed to individual machining steps for maintenance purposes. In this manner, a maintenance activity, for example, a separate overspeeding of the shaft or a balancing can be carried out without any problem. The installation aspect is of particular importance, since, in this special field of application, encapsulated radial bearings are preferably used. The encapsulated radial bearings are constructed in a 360° encompassing manner and in one piece. Therefore, the rotor cannot have larger diameters on the two sides of the bearing point than that allowed by the inside diameter of the radial bearing. The encapsulated and consequently one-piece encompassing formation of the radial bearings is therefore especially advantageous because this can be exposed to aggressive media without damage. Further, no additional sealing steam supplies and similar sealing measures are required at all. In particular, an otherwise customary sealing steam seal is not economically advantageous under the particular operating conditions. This is especially on account of the poor accessibility and the lack of availability of clean sealing gas which results from it.

In addition, the arrangement and the formation of the coupling offer additional constructional potential to dynamically influence the two rotors in the sense according to the invention. The formation of the coupling as a flexible coupling, which simply transmits torque, establishes a decoupling of the compressor rotor from flexural vibrations of the motor rotor. In this case, an especially expedient option is the use of a slender, twistable and flexible shaft, the shaft being flexible on account of its slenderness. That is to say an essentially flexurally untensioned shaft may be used as the coupling between the two rotors. Such a shaft, (in English also referred to as a quill-shaft) is an essentially maintenance-free and particularly simple constructional variant of a flexible coupling. In addition, however, it also has the advantage that it is able to transmit axial forces. In this way only one thrust bearing assembly is required for the two rotors.

A vertical arrangement of the compressor unit has proved to be especially expedient. Specifically, this includes a vertical arrangement of the motor rotor and of the compressor rotor so that a common rotational axis extends in the vertical direction. The compressor is expediently designed in this case in such a way that, on account of the pressure differences which result at the different stages during operation at nominal rating, a thrust ensues. The thrust corresponds essentially to the weight force of the rotor, and the orientation of the thrust is selected in such a way that this is compensated by the weight force. In this way, the thrust bearing assembly of the arrangement can be dimensioned comparatively small. This is because the bearing forces which occur there during operation at nominal speed turn out to be low.

The casing of the compressor unit is expediently constructed in two sections, wherein a parting joint is provided between the compressor and the motor essentially in the region of the coupling. In this way, particularly in the case of large modules, transporting can be carried out in the dismantled state. Also, this split type of construction opens up the possibility of a modular product pallet. In this case, it is to be emphasized that the compressors vary greatly in their overall size on account of the greatly varying operating pressures, especially on account of the different intake flow pressures and outflow pressures. On the other hand, a constancy of the motor unit is easier to ensure. In the case of this embodiment, the configuration according to the invention displays additional advantages, since, even with splitting of the compressor unit in the region of the coupling, the two rotors are radially supported in each case in a secure position in the casing sections.

BRIEF DESCRIPTION OF THE DRAWINGS

The invention is described in more detail in the following based on a special exemplary embodiment with reference to drawings. The embodiment which is shown is to be understood purely for clarification as an example of the invention. In the drawing.

DETAILED DESCRIPTION OF INVENTION

Figure 1:
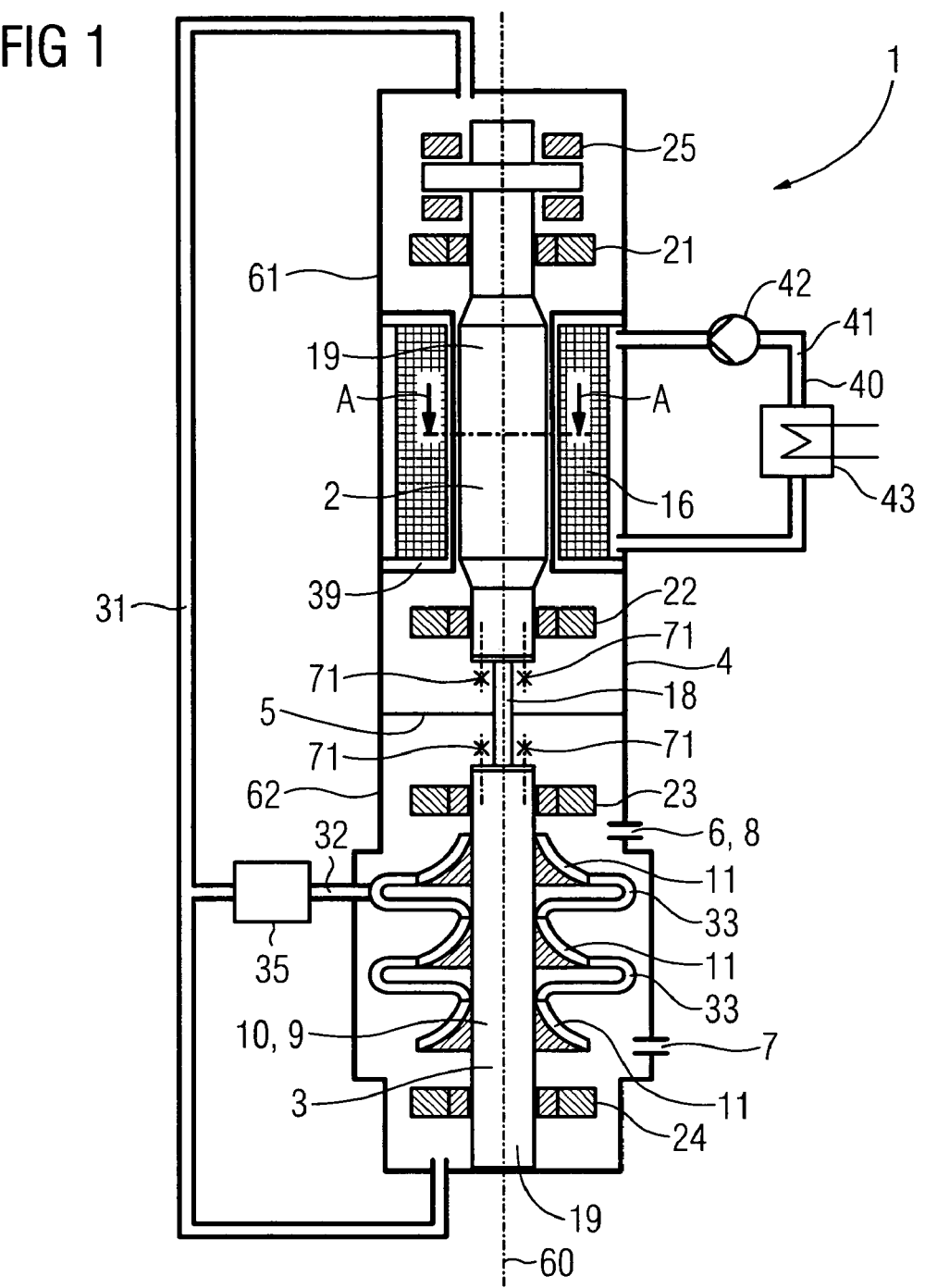
FIG. 1 shows a cross section through a schematic view of a compressor unit according to the invention.

FIG. 1 shows a section along a compressor unit 1 according to the invention, which has a motor 2 and a compressor 3 in a casing 4, which is formed such that it is gastight, as the essential components. The casing 4 is provided with an axial parting joint 5 so that it can be split into two casing sections. The first casing section 61 accommodates the motor 2, and the second casing section 62 accommodates the compressor 3. In the region of the second casing section 62, the casing 4 is provided with an inlet 6 and an outlet 7, wherein the fluid which is to be compressed is drawn in through the inlet 6 by means of an intake connection 8, and the compressed fluid flows out through the outlet 7.

The compressor unit 1 is arranged vertically in operation, wherein a motor rotor 15 of the motor 2 is arranged above a compressor rotor 9 of the compressor 3, via the intermediate arrangement of a coupling 18. The motor rotor 15 and the compressor rotor 9 are combined to form a common shaft 19 which rotates around a common vertical rotational axis 60.

The motor rotor 15 is supported in two radial bearings, these being a first radial bearing 21 at the upper end of the motor rotor 15 and a second radial bearing 22 at the lower end.

The compressor rotor 9 is also supported at the two ends by a radial bearing, these being a third radial bearing 23 in the upper position and a fourth radial bearing 24 in the lower position.

A thrust bearing 25 is provided at the upper end of the common shaft 19, that is to say at the upper end of the motor rotor 15. The radial bearings and the thrust bearing operate electromagnetically and are constructed in each case in an encapsulated manner. The radial bearings in this case extend in the circumferential direction around the respective bearing point of the shaft 19 and in this case are formed in a 360° encompassing manner and in one piece.

The coupling 18 between the two rotors 9, 15 is fastened on the two rotors at the ends by means of screws 71. The coupling 18 is foamed as a slender flexurally untensioned and twistable shaft which on account of its particular processing is able to transmit high torques, wherein it is twisted over its length comparable to a torsion spring. Such shafts are also referred to as a quill-shaft. This flexible coupling, on account of its particular formation 18, transmits the torsional moment between the motor 2 and the compressor 3 and as far as possible decouples both from the vibration of each other. In particular, no flexural vibrations are transmitted. Furthermore, the coupling 18 is in the position to transmit axial forces so that only one common thrust bearing 25 is required for the motor 2 and the compressor 3.

The compressor 3, which is formed as a centrifugal compressor, has three compressor stages 11 which are in communication in each case by means of a cross-over 33. The pressure differences which result at the compressor stages 11 provide for a thrust on the compressor rotor 9, which is transmitted via the coupling 18 to the motor rotor 15 and is directed in opposition to the weight force of the resulting common rotor consisting of compressor rotor 9, coupling 18 and motor rotor 15, so that during operation at nominal rating a thrust balance is carried out as far as possible. In this way, the thrust bearing 25 can be dimensioned comparatively smaller than in a horizontal arrangement.

The electromagnetic bearings 21-24, 25 are cooled to operating temperature by means of a cooling system 31, wherein a tapping 32 in a cross-over of the compressor 3 provides the cooling system 31. From the tapping 32, by means of pipelines, some of the feed medium, which is preferably natural gas, is directed through a filter 35 and then guided through two separate pipelines to the respectively outer bearing points (first radial bearing 21 and fourth radial bearing 24, and also thrust bearing 25). This cooling by means of the cold feed medium economizes on additional supply lines.

The motor rotor 15 is enclosed by a stator 16 which has an encapsulation 39 so that the aggressive feed medium does not damage windings of the stator 16. The encapsulation in this case is preferably designed so that it is able to bear the full operating pressure. This is also because a separate stator cooling system 40 is provided, which supplies a dedicated cooling medium 41 via a heat exchanger 43 by means of a pump 42. The encapsulation 39 is at least constructed in such a way that the section which extends between the stator 16 and the motor rotor 15 certainly has a thin wall thickness, but in the case of a complete filling of the stator cooling system 40 by means of the cooling medium 41 is in the position to withstand the design pressure. In this way, relatively large eddy-current losses in this region are avoided and the efficiency of the overall arrangement is improved.

The compressor rotor 9 expediently has a compressor shaft 10 upon which the individual compressor stages 11 are mounted. This can preferably be carried out by means of a thermal shrink fit. A form-fit, for example by means of polygons, is also possible. Another embodiment provides welding of different compressor stages 11 to each other, from which results a one-piece compressor rotor 9.

Figure 2:
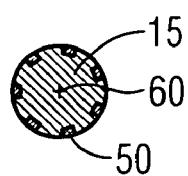
FIG. 2 shows a sectional view according to the section AA in FIG. 1.

FIG. 2 shows a section (A-A) through the motor rotor 15 in the region of the motor 2. The motor rotor 2 has recesses into which conductor elements 50 are inserted.

The invention claimed is:

1. A compressor unit for underwater operation, comprising:
   a compressor comprising a compressor rotor and a plurality of compressor stages;
   an electric motor comprising a stator a motor rotor and a gastight casing with an inlet and an outlet, wherein
      the motor rotor comprises a first radial bearing and a second radial bearing, wherein each of the first and second radial bearings is arranged at the ends of the motor rotor,
      the compressor rotor comprises a third radial bearing and a fourth radial bearing, each of the third and fourth radial bearings being arranged at an end of the compressor rotor,
   a torque transmitting coupling arranged between the compressor rotor and the motor rotor that connects the compressor and motor rotors to form a common rotor which extends in the vertical direction,
   wherein the compressor is designed such that, during operation of the compressor at a nominal rating of the compressor, a pressure difference is established over each of the compressor stages, and wherein, as a result of the pressure differences over the plurality of compressor stages, a thrust ensues, and
   wherein the ensuing thrust corresponds essentially to a weight force of the common rotor, and the orientation of the thrust is selected such that the thrust compensates for a weight force of the common rotor.

2. The compressor unit as claimed in claim 1, wherein the coupling is a flexible coupling.

3. The compressor unit as claimed in claim 2, wherein the radial bearings are electromagnetic bearings.

4. The compressor unit as claimed in claim 3, wherein at least one thrust bearing is provided on one of the two rotors.

5. The compressor unit as claimed in claim 4, wherein the coupling is a slender and twistable shaft arranged between the two rotors.

6. The compressor unit as claimed in claim 5, wherein the coupling is a quill-shaft.

7. The compressor unit as claimed in claim 6, wherein only one thrust bearing is provided.

8. The compressor unit as claimed in claim 1, wherein, for a vertical arrangement, the motor rotor is arranged vertically above the compressor rotor.

9. The compressor unit as claimed in claim 8, the thrust bearing is arranged in an upper region of the motor rotor.

10. The compressor unit as claimed in claim 9, wherein the motor rotor is formed in a stacked lamination type construction.

11. The compressor unit as claimed in claim 10, wherein the motor rotor is formed via a through-going type construction and with conductor elements inserted in recesses that extend in the longitudinal direction.

12. The compressor unit as claimed in claim 11, wherein the radial bearings and thrust bearing are encapsulated.

* * * * *